United States Patent
Pliml, Jr.

(10) Patent No.: US 6,324,731 B1
(45) Date of Patent: Dec. 4, 2001

(54) ISOLATOR FAN FASTENER

(75) Inventor: Frank V. Pliml, Jr., Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/019,502

(22) Filed: Feb. 5, 1998

(51) Int. Cl.$^7$ .............................. A44B 17/00; F16B 13/06
(52) U.S. Cl. ............................ 24/453; 24/297; 24/573.1; 24/607; 411/46
(58) Field of Search ..................... 24/453, 297, 573.1, 24/607; 411/41

(56) References Cited

U.S. PATENT DOCUMENTS

| | | | |
|---|---|---|---|
| 4,457,050 | * | 7/1984 | Kanzaka ................................. 24/453 |
| 4,579,473 | * | 4/1986 | Brugger ................................. 24/453 |
| 4,757,664 | * | 7/1988 | Freissle ................................. 52/509 |
| 5,214,826 | * | 6/1993 | Fortune ................................. 24/573.1 |
| 5,568,675 | * | 10/1996 | Asami et al. .......................... 24/453 |
| 5,775,860 | * | 7/1998 | Meyer ................................... 411/46 |

FOREIGN PATENT DOCUMENTS

| | | | |
|---|---|---|---|
| 1220181 | * | 5/1960 | (FR) ..................................... 24/297 |
| 0676355 | * | 11/1964 | (IT) ...................................... 24/297 |

\* cited by examiner

*Primary Examiner*—Victor N. Sakran
(74) *Attorney, Agent, or Firm*—Pitney, Hardin, Kipp & Szuch LLP

(57) ABSTRACT

An isolator fan fastener for securing a cooling fan housing to the interior chassis of a computer is described. The fastener is comprised of a pin made of a hard impact resistant plastic and an isolator grommet made of a soft resiliently flexible plastic. The pin is frictionally engageable with the isolator grommet. In operation the isolator grommet is preinstalled in the fan housing. Insertion of the pin through the chassis and into the isolator grommet completes the mounting. An isolator fan fastener in accordance with the invention yields enhanced acoustical properties when compared to prior art fasteners.

4 Claims, 2 Drawing Sheets

ISOLATOR FAN FASTENER

BACKGROUND OF THE INVENTION

1. Field of the Invention

This invention relates to a fastener for joining two parts, and more particularly, to a plastic fastener comprising a pin and an isolator grommet for joining the housing of a computer cooling fan to the chassis of the computer. The isolator grommet is preinstalled in the fan housing. Insertion of the pin through the chassis and into the isolator grommet completes the mounting.

2. Description of the Prior Art

Fasteners for joining apertured work pieces are well known in the prior art, and are usually manufactured of metal or plastic. The nut and bolt and the screw are examples of common metallic fasteners, while examples of plastic fasteners are shown in U.S. Pat. Nos. 2,882,780 and 2,941,439.

When joining the cooling fan housing of a computer to the chassis of the computer, however, many prior art fasteners have proven unsatisfactory. With regard to metallic fasteners, they generally have a high elastic modulus, making them poor isolators of the vibrations caused by the operation of the fan, often resulting in bothersome and unacceptable noise. Second, metallic fasteners are relatively more difficult to install than plastic fasteners, often requiring use of a tool, such as a wrench or a screwdriver. Third, metallic fasteners are conductive and thus could prove hazardous if lost inside the computer.

With respect to plastic fasteners, many plastic fasteners have proven unsatisfactory in that they, as with metallic fasteners, insufficiently isolate the vibrations caused by the operation of the fan. Other plastic fasteners are difficult to install and/or remove, and yet other fasteners provide a weak coupling between the fan housing and the chassis.

It is therefore an object of the present invention to provide a plastic fastener for securing a fan housing to the chassis of a computer which results in a quieter mounting than that achieved by currently used fasteners. Another object of the present invention is to provide a plastic fastener which provides a secure connection between the housing and the chassis. Yet another object of the present invention is to provide a fastener which can be easily installed and removed. Other objects will become apparent from the discussion below.

SUMMARY OF THE INVENTION

An isolator fan fastener in accordance with the present invention achieves the above and other beneficial objects by providing a plastic fastener having a pin and a separate isolator grommet with an axial bore extending therethrough. The pin has a head and a shank. The shank has a first engaging portion, a second engaging portion, a third engaging portion and a fourth engaging portion. The four engaging portions have varying diameters and, as discussed below, are frictionally engageable with corresponding portions of the interior walls of the isolator grommet.

The isolator grommet has a head, a shank, a circumferential lip, and an axial bore of varying dimension extending therethrough for receiving the pin. The bore forms a first interior wall portion for receiving the first engaging portion of the pin shank in releasable frictional engagement, a second interior wall portion for receiving the second engaging portion of the pin shank in releasable frictional engagement, a third interior wall portion for receiving the third engaging portion of the pin shank in releasable frictional engagement, and a fourth interior wall portion for receiving the fourth engaging portion of the pin shank in releasable frictional engagement.

In operation the shank of the isolator grommet is inserted into a hole in the fan housing such that the wall of the fan housing is situated between the head and lip of the isolator grommet and the head and lip bear against the outer and inner surfaces of the housing, respectively. The isolator grommet is dimensioned in the manufacturing process to mate with a fan housing of predefined thickness, i.e. the thickness of the fan housing corresponds to the distance between the head and lip on the grommet.

The bore in the grommet is then aligned with the hole on the computer chassis with the isolator grommet head bearing against the inside of the chassis. The pin is inserted into the grommet until the pin head bears against the outside surface of the chassis. The pin is dimensioned in the manufacturing process for use with a computer chassis of predefined thickness. When the pin is fully inserted into the chassis the first engaging portion on the pin shank is in releasable frictional engagement with the first interior wall portion of the grommet, the second engaging portion on the pin shank is in releasable frictional engagement with the second interior wall portion of the grommet, the third engaging portion on the pin shank is in releasable frictional engagement with the third interior wall portion of the grommet, and the fourth engaging portion of the pin shank is in releasable frictional engagement with the fourth interior wall portion of the grommet.

At that point the fan housing is firmly and releasably fastened to the chassis. The isolator grommet is manufactured of a soft plastic such that it isolates a large portion of the vibration of the fan, thereby reducing the noise level. The pin, on the other hand, is manufactured of a hard plastic to ensure secure coupling with the isolator grommet, thereby securely fastening the fan housing to the chassis.

An isolator fan fastener in accordance with the present invention offers numerous advantages over the prior art. First, the noise caused by the operation of the fan is reduced as compared to many prior art fasteners. Second, the frictional engagement of the pin and the isolator grommet ensures a secure fastening. Third, the fan housing may be attached or detached to the computer chassis by simple insertion or extraction of the pin into or out of the isolator grommet without use of excessive force or a special tool. Other advantages will become apparent from the discussion below.

DETAILED DESCRIPTION OF THE PREFERRED EMBODIMENT

The aforementioned Figures illustrate an isolator fan fastener in which the same numbers represent identical elements.

Figure 1:
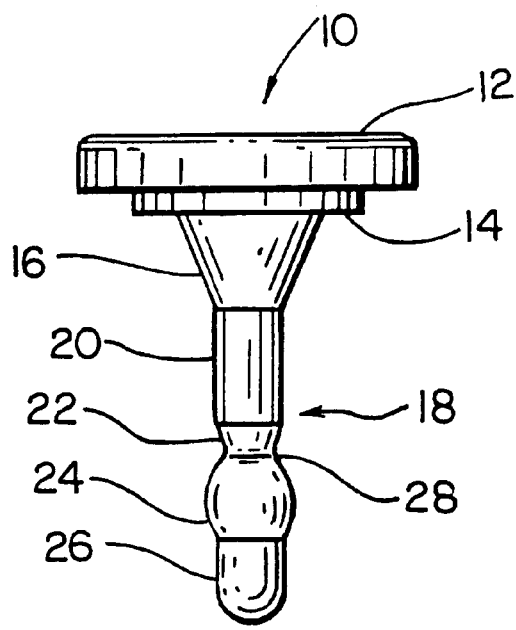
FIG. 1 is a front view of the pin.

With reference to FIG. 1, numeral 10 represents the fastener pin in accordance with the preferred embodiment of the invention. The pin has a head 12, a spacer 14, a tapered shoulder 16 and a shank 18. The shank is further comprised of a cylindrical first engaging portion 20, a tapered second engaging portion 22, a spherical third engaging portion 24 and a cylindrical fourth engaging portion 26. Pin 10 is circular in cross section and is molded from a hard, impact resistant plastic, such as nylon 6/6 or hard santoprene.

First engaging portion 20 and fourth engaging portion 26 have the same diameter. Second engaging portion 22, adjacent first engaging portion 20, tapers on a circular arc to a minimum diameter to form a neck 28. Third engaging portion 24, adjacent second engaging portion 22, expands spherically from said minimum diameter to a maximum diameter and then tapers to a diameter equal to that of first engaging portion 20 and fourth engaging portion 26.

Figure 2:
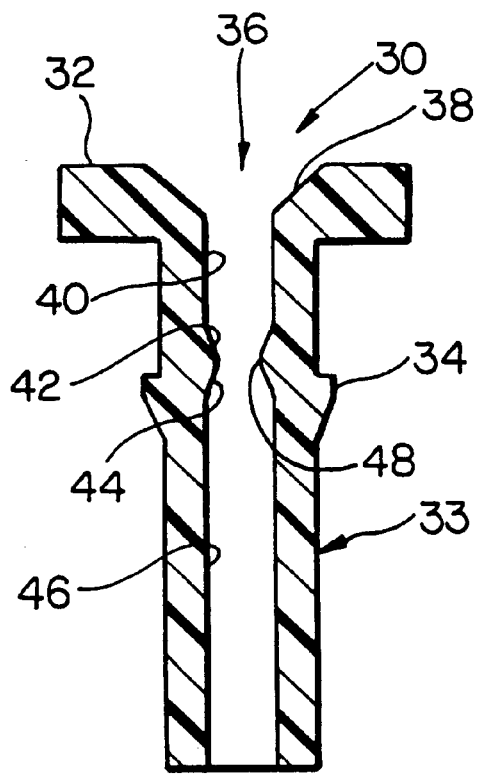
FIG. 2 is a front view of the isolator grommet.

With reference to FIG. 2, numeral 30 represents the isolator grommet in accordance with the preferred embodiment of the invention. Isolator grommet 30 is circular in cross section and has a head 32, a shank 33, a headwardly flexible circumferential outer lip 34 and a circular bore 36 for receiving pin 10. Bore 34 is of varying diameter and forms a mouth portion 38 for receiving pin shoulder 16, a coextensive cylindrical first interior wall portion 40 for receiving shank first engaging portion 20 in releasable frictional engagement, a coextensive tapered second interior wall portion 42 for receiving shank second engaging portion 22 in releasable frictional engagement, a coextensive expanding third interior wall portion 44 for receiving shank third engaging portion 24 in releasable frictional engagement, and a cylindrical fourth interior wall portion 46 for receiving shank fourth engaging portion 26 in releasable frictional engagement. Fourth interior wall portion 46 should generally be at least coextensive with shank fourth engaging portion 26. However, in practice it is generally longer as this allows isolator grommet to be positioned in the fan housing by a pulling action. Second interior wall portion 42 and third interior wall portion 44 form a neck 48 which receives shank neck 28.

First interior wall portion 40 and fourth interior wall portion 46 are of equal diameter, and said diameter is slightly smaller that the diameter of shank first and fourth engaging portions 20, 26, thereby allowing for a friction fit therebetween. Typically, the diameter of first and fourth interior wall portions 40, 46 will be on the order of 14% smaller than the diameter of shank first and fourth engaging portions 20, 26. Similarly, tapered second interior wall portion 42 has a shape complementary to that of shank second engaging portion 22 and has a minimum diameter smaller than the minimum diameter of shank second engaging portion 22. Typically, the minimum diameter of second interior wall portion 42 will be on the order of 21% smaller than the minimum diameter of shank second engaging portion 22. Expanding third interior wall portion 44 has a maximum diameter approximately 26% smaller than the maximum diameter of shank third engaging portion 24. From comparison of FIGS. 1 and 2 it is clear that third interior wall portion 44 is not complementary in shape to shank third engaging portion 24, i.e. third interior wall portion 44 is not spherical. This configuration ensures that in addition to a tight friction fit, the engagement of shank neck 28 and grommet neck 48 will provide an additional retention force to resist the extraction of pin 10 since spherical shank third engaging portion 24 would have to pass through the narrow passage formed by neck 48.

So that it may act as a vibration isolator and deform so as to frictionally engage with pin 10, isolator grommet 30 is manufactured of a soft, resiliently deformable plastic such as a thermoplastic elastomer (TPE) or soft santoprene.

Figure 3:
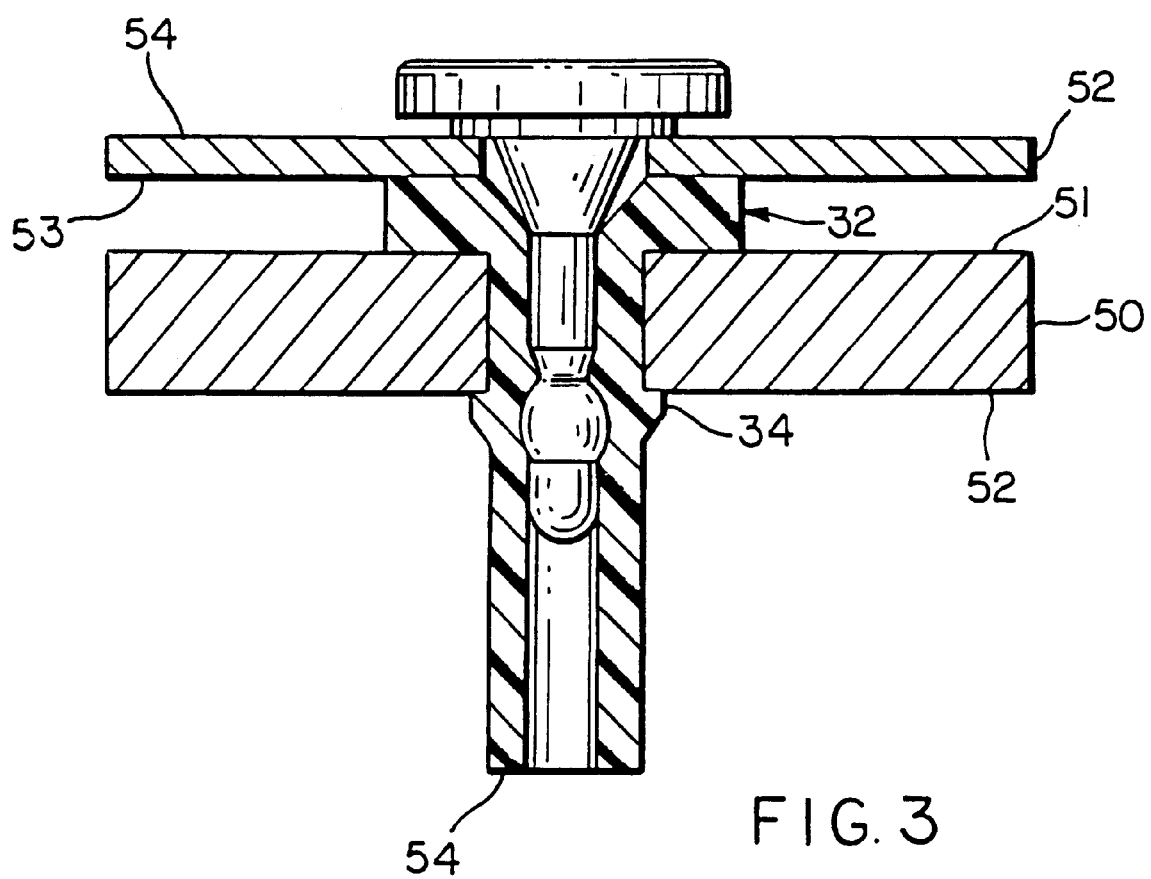
FIG. 3 is a front cross-sectional view of the assembled fastener joining a fan housing to the chassis of a computer.

In operation the fastener is used as follows. FIG. 3 shows the assembled fastener joining a fan housing 50 to the chassis of a computer 52. Isolator grommet 30 is inserted into the hole in fan housing 50. This is done by insertion of distal end 54 of shank 33 into the hole and the pulling of said distal end until circumferential lip 34 flexes and fan housing 50 becomes positioned between head 32 and circumferential lip 34 such that surface S1 bears against the underside of head 32 and surface S2 bears against circumferential lip 34, as shown in FIG. 3. Because the distance between head 32 and lip 34 corresponds to the thickness of the fan housing, isolator grommet 30 is manufactured for use with a fan housing of a predetermined thickness. Next, grommet bore 36 is aligned with the hole in the computer chassis 52 such that the upper side of grommet head 32 bears against the interior surface S3 of the chassis 52. Pin 10 is then inserted into isolator grommet 30 until spacer 14 bears against the exterior surface S4 of chassis 52. Because pin 10 and isolator grommet 30 are made of plastic, a relatively small axial force is needed to effect interengagement, which may even be accomplished by hand.

In order for pin 10 to mate with isolator grommet 30, the length of shoulder portion 16 is adjusted in the manufacturing process for the thickness of chassis 52, i.e. the axial length of shoulder portion 16 is equal to the sum of the thickness of chassis 52 plus the axial length of grommet mouth 38. Thus, pin 10 and isolator grommet 30 are manufactured for use with a fan housing and chassis of predetermined thicknesses.

When pin 10 is fully inserted into isolator grommet 30 the fastener is locked and fan housing 50 is securely fastened to chassis 52. Because the diameter of pin shank 18 is everywhere larger than the diameter of grommet bore 36, insertion of pin 10 into isolator grommet 30 causes expansion of the interior walls of isolator grommet 30, thereby frictionally engaging pin 10 and isolator grommet 30. Thus, first interior wall portion 40 expands to receive shank first engaging portion 20, second interior wall portion 42 expands to receive shank second engaging portion 22, third interior wall portion 44 expands to receive shank third engaging portion 24, and fourth interior wall portion 46 expands to receive shank fourth engaging portion 26. Thus, pin shank 18 is everywhere frictionally engaged with isolator grommet 30. In addition, the engagement of shank neck 28 with neck 48 provides an additional retention force since spherical shank third engaging portion 24 must pass through the narrow passage formed by neck 48 in order to extract pin 10.

The fastener is thus releasably locked and the fan housing is securely and releasably fastened to the chassis. If one desires to remove the fan housing, pin 10 may simply be extracted from isolator grommet 30 by the application of relatively little axial force. Pin spacer 14 provides a space between pin head 12 and outer surface S4 of chassis 52, thereby facilitating the use of an extracting tool, such as a pair of pliers, a screwdriver or even a human hand.

The improved acoustical properties of the fastener are achieved by the use of the soft plastic isolator grommet in connection with the hard plastic pin. The isolator grommet is in direct contact with the fan housing and is able to isolate a significant portion of the fan's vibration. The use of a hard pin, on the other hand, ensures that a tight coupling will be achieved with the isolator grommet and that fan housing will be securely fastened to chassis.

While the present isolator fan fastener is suitable for use with a cooling fan housing and a computer chassis, it should be understood that the fastener is not limited to such use and can be used to join any apertured parts.

What is claimed is:

1. A plastic fastener for securing a first part to a second part, said fastener comprising:

a pin having a circular cross section;

said pin having a head at a proximal end, a coaxial shoulder adjacent the head, and a coaxial shank adjacent the shoulder;

said shank having a first engaging portion adjacent said shoulder, a second engaging portion adjacent said first engaging portion, a third engaging portion adjacent said second engaging portion, and a fourth engaging portion adjacent said third engaging portion;

an isolator grommet having a circular cross section for receiving said pin in releasable frictional engagement;

said isolator grommet having a proximal end and a distal end, a head at said proximal end, a shank, a flexible circumferential lip on said shank located distally from said head at a distance corresponding to the thickness o one of said parts, and a circular axial bore of varying diameter extending therethrough;

said bore forming a mouth for receiving said pin shoulder, a first interior wall portion releasable frictionally engageable with said shank first engaging portion, a second interior wall portion releasably frictionally engageable with said shank second engaging portion, a third interior wall portion releasably frictionally engageable with said shank third engaging portion, and a fourth interior wall portion releasably frictionally engageable with said shank fourth engaging portion;

said pin shoulder having an axial length equal to the sum of the axial length of said grommet mouth plus the thickness of the other of said parts;

wherein said shank first and fourth engaging portions have a constant equal diameter, said shank second engaging portion tapers to a minimum diameter to form a neck, said third engaging portion expands from said minimum diameter to a maximum diameter and then tapers to a diameter equal to the diameter of said fourth engaging portion;

said first and fourth interior wall portions have a constant equal diameter smaller than the diameter of said shank first and fourth engaging portions, said first interior wall portion being coextensive with said shank first engaging portion and said fourth interior wall portion being at least coextensive with said shank fourth engaging portion;

said second interior wall portion is coextensive with said shank second engaging portion and tapers to a minimum diameter smaller than said minimum diameter of said shank second portion to form a neck; and said third interior wall portion is coextensive with said shank third engaging portion and expands from said minimum diameter of said second interior wall portion to said diameter of said fourth interior wall portion.

2. A fastener according to claim 1 wherein said pin is made of a hard, impact resistant plastic.

3. A fastener according to claim 1 wherein said isolator grommet is made of a soft, resiliently deformable plastic.

4. A fastener according to claim 1 further comprising a spacer between said pin head and shoulder.

* * * * *